(12) United States Patent
Kung et al.

(10) Patent No.: US 10,931,647 B2
(45) Date of Patent: Feb. 23, 2021

(54) DATA FORWARDING SYSTEM

(71) Applicant: Quanta Computer Inc., Taoyuan (TW)

(72) Inventors: Mao-Tien Kung, Taoyuan (TW);
Chia-Chen Chiang, Taoyuan (TW);
Meng-Yu Li, Taoyuan (TW);
Chun-Hung Chen, Taoyuan (TW);
Chen-Chung Lee, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 156 days.

(21) Appl. No.: 16/200,867

(22) Filed: Nov. 27, 2018

(65) Prior Publication Data

US 2019/0297059 A1 Sep. 26, 2019

(30) Foreign Application Priority Data

Mar. 20, 2018 (TW) ................. 107109431

(51) Int. Cl.
*H04L 29/06* (2006.01)
*H04L 9/08* (2006.01)
*G06F 21/60* (2013.01)

(52) U.S. Cl.
CPC ........ *H04L 63/0428* (2013.01); *G06F 21/602* (2013.01); *H04L 9/0819* (2013.01); *H04L 9/0891* (2013.01); *H04L 63/10* (2013.01); *H04L 2463/101* (2013.01)

(58) Field of Classification Search
None
See application file for complete search history.

(56) References Cited

U.S. PATENT DOCUMENTS

2018/0007033 A1* 1/2018 Ajitomi ............... H04L 63/0823
2018/0144147 A1* 5/2018 Nix ....................... H04L 9/0869

FOREIGN PATENT DOCUMENTS

CN 106658442 A 5/2017
CN 107566355 A 1/2018

OTHER PUBLICATIONS

Chinese language office action dated Nov. 16, 2018, issued in application No. TW 107109431.

* cited by examiner

*Primary Examiner* — Brandon S Hoffman
(74) *Attorney, Agent, or Firm* — McClure, Qualey & Rodack, LLP

(57) ABSTRACT

The data forwarding system includes a data storage device and a server. The data storage device is configured to store shared data uploaded by a first developer via a first terminal device. The server includes a processor which can load program codes to execute: a forwarding procedure for forwarding the shared data to a receiving device; a forwarding setting procedure for enabling the developer to apply forwarding settings to the shared data; a data processing procedure for executing the necessary data processing before forwarding the shared data; and a forwarding condition verification procedure for examining whether the shared data conforms to the forwarding settings.

5 Claims, 5 Drawing Sheets

DATA FORWARDING SYSTEM

CROSS REFERENCE TO RELATED APPLICATIONS

This application claims priority of Taiwan Patent Application No. 107109431, filed on Mar. 20, 2018, the entirety of which is incorporated by reference herein.

BACKGROUND OF THE INVENTION

Field of the Invention

The present disclosure relates to a data forwarding system and, in particular, to a data forwarding system in which a developer can set conditions for forwarding, select a data sharing object, and select whether to encrypt the shared data.

Description of the Related Art

Nowadays, IoT (Internet of Things) technology has made great progress, and it still has a lot of room for development and application in the future. In a common IoT architecture, many devices are connected to a server through a wireless network. Therefore, how to fully utilize and share the information of each terminal device in an Internet of Things and provide a high degree of data security is an important issue of the Internet of Things.

In today's Internet of Things technology, if a device exchanges data between different devices, a common method is to upload the data to the cloud server of the Internet of Things through a wireless network, and the cloud server forwards the data to another receiving device. In the conventional art, a common practice is for the cloud server to store the received data in a Message Queue system, and to synchronize the message queues of the received data to other message queues, so that other devices can receive the data. However, the message queue system itself has only a simple login verification mechanism, so once a malicious device successfully logs in to the cloud server, it can obtain all the information of the message queue system and generate security and privacy threats. In addition, there may be a large amount of information in the message queue, but not every piece of data is valid information that the receiving device wants to receive. Therefore, such a message queue system will also cause unnecessary data transmission in the network, thereby causing waste of energy and network performance.

BRIEF SUMMARY OF THE INVENTION

In accordance with one feature of the present invention, the present disclosure provides a data forwarding system to improve security and privacy in IoT. The data forwarding system includes a data storage device and a server. The data storage device is configured to store shared data uploaded by a first developer via a first terminal device. The server includes a processor which can load program codes to execute: a forwarding procedure for forwarding the shared data to a receiving device; a forwarding setting procedure for enabling the developer to apply forwarding settings to the shared data; a data processing procedure for executing the necessary data processing before forwarding the shared data; and a forwarding condition verification procedure for examining whether the shared data conforms to the forwarding settings.

The data forwarding system as mentioned above, wherein the forwarding settings comprise whether to encrypt the shared data before forwarding the shared data; and the processor further executes an encryption processing procedure, and when the processor, in the forwarding condition verification procedure, determines to encrypt the shared data before forwarding the shared data, the processor encrypts the shared data and transmits a decryption key to the receiving device.

The data forwarding system as mentioned above, during the processor executing the encryption processing procedure, after automatically replacing the decryption key, the processor transmits the decryption key to the receiving device.

The data forwarding system as mentioned above, wherein the processor further executes: a key rights management procedure for enabling the developer to manage all authorized usage keys; a permission verification procedure for verifying the usage key of a second terminal device to determine usage rights of the shared data for the connection from the second terminal device; and an authorization request procedure for requesting an authorization request of the shared data from a user of the second terminal device to notify the developer that an authorization review is to be performed.

The data forwarding system as mentioned above, wherein when the authorization request meets an established rule, the authorization request procedure determines that direct authorization is carried out without notifying the developer that an authorization review is to be performed.

The data forwarding system as mentioned above, wherein the data storage device is a memory device disposed in the server.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

Figure 1A:
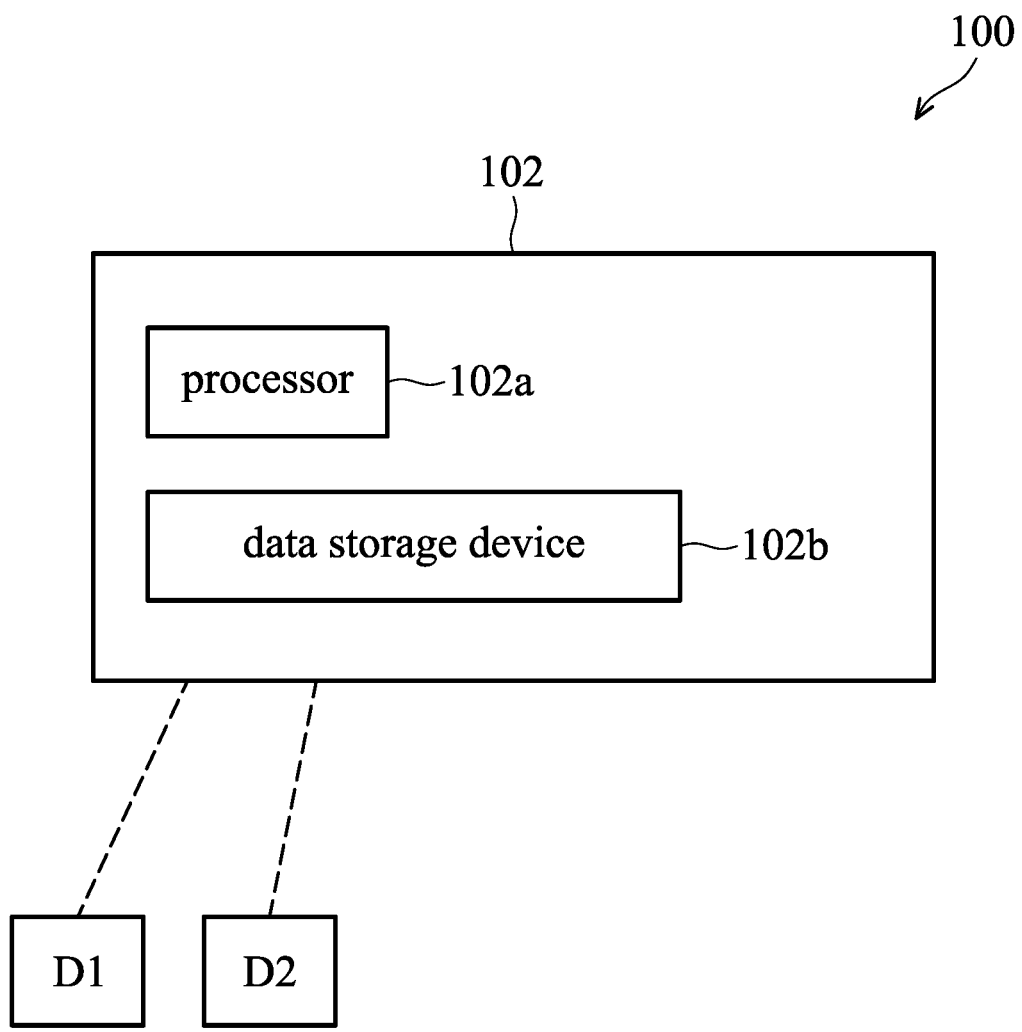
FIG. 1A is a block diagram of a data forwarding system in accordance with one embodiment of the present disclosure.

FIG. 1A is a block diagram of a data forwarding system 100 in accordance with one embodiment of the present disclosure. A data forwarding system 100 includes a server 102 and a data storage device 102b. Two terminal devices D1 and D2 are linked to the server 102 via a wireless network. The two terminal devices D1 and D2 share data through the server 102.

The server 102 includes a processor 102a and the data storage device 102b. The processor 102a loads the code to execute a number of different procedures. In this embodiment, the processor 102a has the ability to execute the function related to a data forwarding procedure. The data storage device 102b is a device located inside the server 102, and its function includes storing data uploaded from the terminal devices D1 and D2 to the server 102, but is not limited thereto. It should be noted that the data storage device 102b may also be an external storage device independent of the server 102 and linked to the server 102. The data storage device 102b can also be used as a message queue.

In this embodiment, both the terminal devices D1 and D2 have the function of wireless network connection. The terminal devices D1 and D2 link to the server 102 via a wireless network. In a common embodiment, the terminal devices D1 and D2 can be, for example, terminals disposed in the same factory area or inside a building and having a sensing function (for example, operating with a camera, a temperature and humidity sensor, etc.). The terminal devices D1 and D2 transmit back the sensed/collected parameters to the server 102, but it is not limited thereto, as long as it is a terminal device that can be linked to the server 102 and transmits data to the server 102. In addition, the terminal devices D1 and D2 belong to a first user and a second user, respectively. The first user can control the privacy of the data transmitted by the terminal device D1 to the server 102, such as whether other users have the right to read the data uploaded by the terminal device D1, etc. Similarly, the second user can control the privacy of the data transmitted by the terminal device D2 to the server 102. The method for controlling the privacy of the data of the user's own device is as follows.

In this embodiment, the terminal device needs to use a key to log in to the server 102, and different keys represent different data transmission and/or reading rights. In this embodiment, the terminal device D1 logs in to the server 102 using a first key. The terminal device D2 logs in to the server 102 using a second key.

In a common setting, the device of the same user can use the same key to log in to the server. For example, if the second user owns another terminal device D3 (not shown), the terminal device D3 can also log in to the server 102 using the second key. The advantage of this setup is that the number of keys that the server 102 needs to manage can be reduced to increase the efficiency of the system.

When a terminal device logs in to the server 102, the processor 102a executes a permission verification procedure to verify the data transmission and/or reading rights of the key used by the terminal device. For example, in this embodiment, the terminal device D1 uses the first key to log in to the server 102, and the first key has the right to upload data to the server 102. Thus, after the permission verification procedure verifies the permission of the first key, the terminal device D1 can transmit its own data to the server 102. In this embodiment, the terminal device D1 transmits a plurality of first data to the server 102.

In this embodiment, the second key used by the terminal devices D2 does not initially have the right to read the first data. As such, if the terminal device D2 wants to obtain the first data uploaded to the server 102, the terminal device D2 must send an authorization request to the server 102. After the server 102 receives the authorization request, the processor 102a executes an authorization request procedure to notify the first user. If the first user agrees to the authorization request, the first user, for example, can send a consent notification to the server 102, and the processor 102a executes a key rights management procedure to give the right to the second key for reading the first data. Therefore, the terminal device D2 can read the first data by using the second key to log in to the server 102.

In a preferred embodiment, if the second user or the terminal device D2 meets certain preset conditions, the authorization application procedure can automatically agree to the authorization request, without notifying the first user. The preset condition may be: if the first user has already agreed to another authorization request from the second user, or if the authorization application is a re-request after the original authorization request expired, etc., but is not limited thereto. The above automatic authorization mechanism can reduce the waiting time for reviewing and improving the efficiency of the system's overall resource use.

The processor 102a can further execute a key rights management procedure to enable the user to manage all authorized keys, for example, adding or removing a key to read the permission of the user's device to upload the data to the server 102. For example, after the first user grants the second key to the right to read the first data, the second user further gives the second key to a third user. If the terminal device D4 (not shown) owned by the third user uses the second key to log in to the server 102, the terminal device D4 can obtain the first data without the consent of the first user. When the first user encounters a situation as described above, the server 102 can be notified and the key rights management procedure is executed by the processor 102a to remove the right for reading the first data by the second key. Thus, the terminal devices D2 and D4 also lose the ability to read the first data.

When performing data sharing, the processor 102a performs a forwarding procedure to forward the shared data to a receiving device. In this embodiment, the forwarding procedure transmits the first data to the terminal device D2.

The processor 102a can further execute a forwarding setting procedure to enable user to forward the shared data. For example, the user can select specific data not to be forwarded, conditional forwarding (for example, to arrive at a specific time or to encounter certain events to forward the data), and/or whether to encrypt before forwarding, etc., but not limited thereto. In this embodiment, the first user performs the forwarding setting procedure executed by the processor 102a to apply forwarding settings to the first data.

The processor 102a can execute a data processing procedure to complete all data processing before forwarding the data. For example, the data is encrypted according to the settings set by user, or the confidential content of the data is removed (such as the user's own information, etc.). In this embodiment, the processor 102a executes the data processing procedure to process the first data.

The processor 102a can further execute a forwarding condition verification procedure. Before forwarding the shared data, the processor 102a checks whether the shared data conforms to the forwarding settings described above. In this embodiment, the forwarding condition verification procedure verifies whether the processed first data conforms to the forwarding settings set by the first user.

In a preferred embodiment, the developer can determine to encrypt the shared data. Taking the data forwarding system 100 of FIG. 1 as an example, the processor 102a can encrypt the first data, and a decryption key and a ciphertext (i.e., the encrypted first data) are generated during the encryption process. After the encryption is completed, the server 102 transmits the ciphertext and the decryption key to the terminal device D2. The terminal device D2 can decrypt the ciphertext and revert it to the first data. The encryption method may be any known encryption method, such as AES or RSA encryption, but it is not limited thereto.

In another preferred embodiment, the hardware resources of the terminal device D2 may not have the computing ability required for decryption. Thus, the terminal device D2 can transmit the received ciphertext and the decryption key back to the server 102 to indicate that the terminal device D2 is not a malicious user device which intercepts the ciphertext. The processor 102a decrypts the ciphertext and transmits the decrypted first data to the terminal device D2.

It should be noted that the terminal device D2 must return the correct decryption key, and then the server 102 can decrypt the ciphertext into the first data. If a malicious terminal device D5 (not shown) returns a fake decryption key and the ciphertext, the server 102 cannot decrypt and return the correct first data. Thus, the data received by the malicious terminal device D5 is a blank message, and the correct first data cannot be obtained.

Figure 1B:
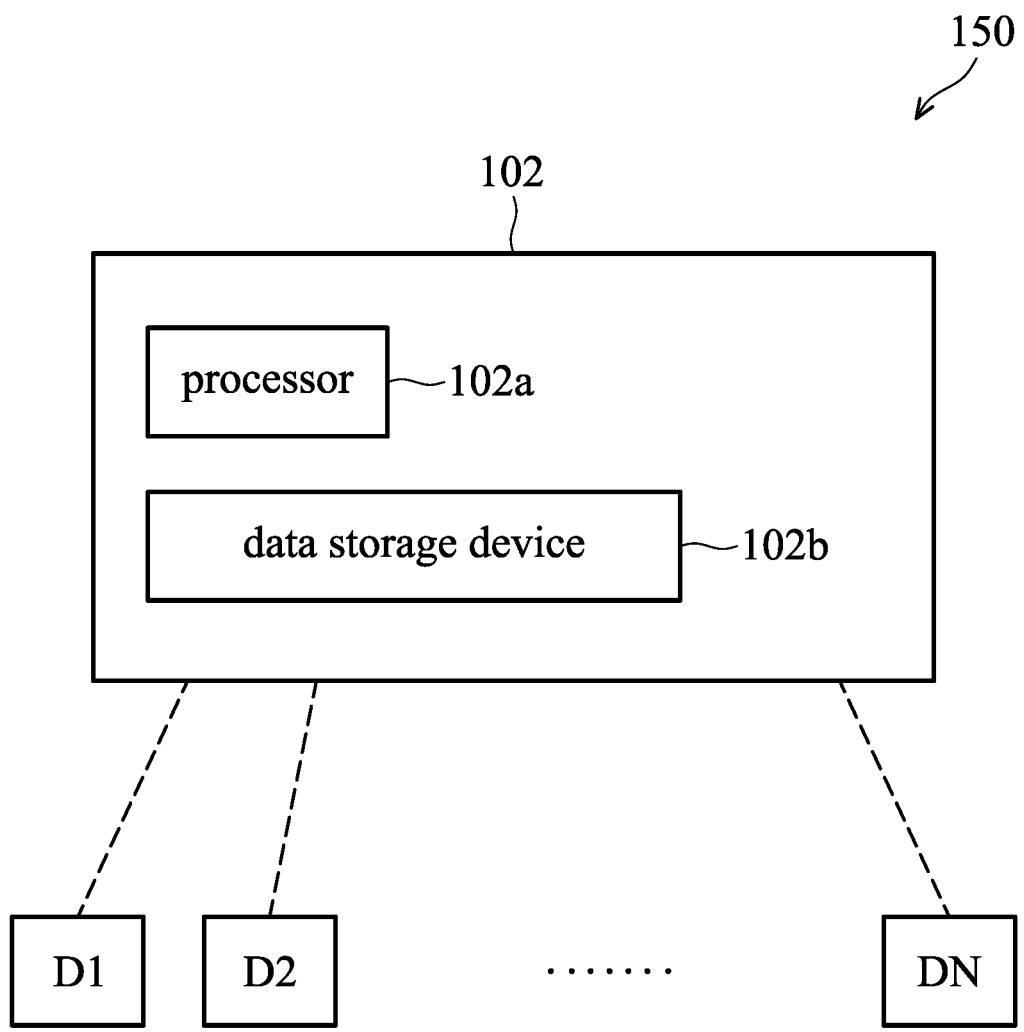
FIG. 1B is a block diagram of a data forwarding system in accordance with another embodiment of the present disclosure.

It should be understood that in the embodiment of FIG. 1A, for the convenience of explanation, only two terminal devices are connected to the data forwarding system 100 and exchange data, but the system of the present disclosure should not be limited to thereto. FIG. 1B is a block diagram of a data forwarding system 150 in accordance with another embodiment of the present disclosure. The data forwarding system 150 connects the N terminal devices D1~DN through the wireless network, and allows the terminal devices D1~DN to exchange data through the data forwarding system 150. The person skilled in the art, after reading the relevant description of the data forwarding system 100 of FIG. 1A above, should apply the same technique to the data forwarding system of any scale as shown in FIG. 1B.

Figure 2:
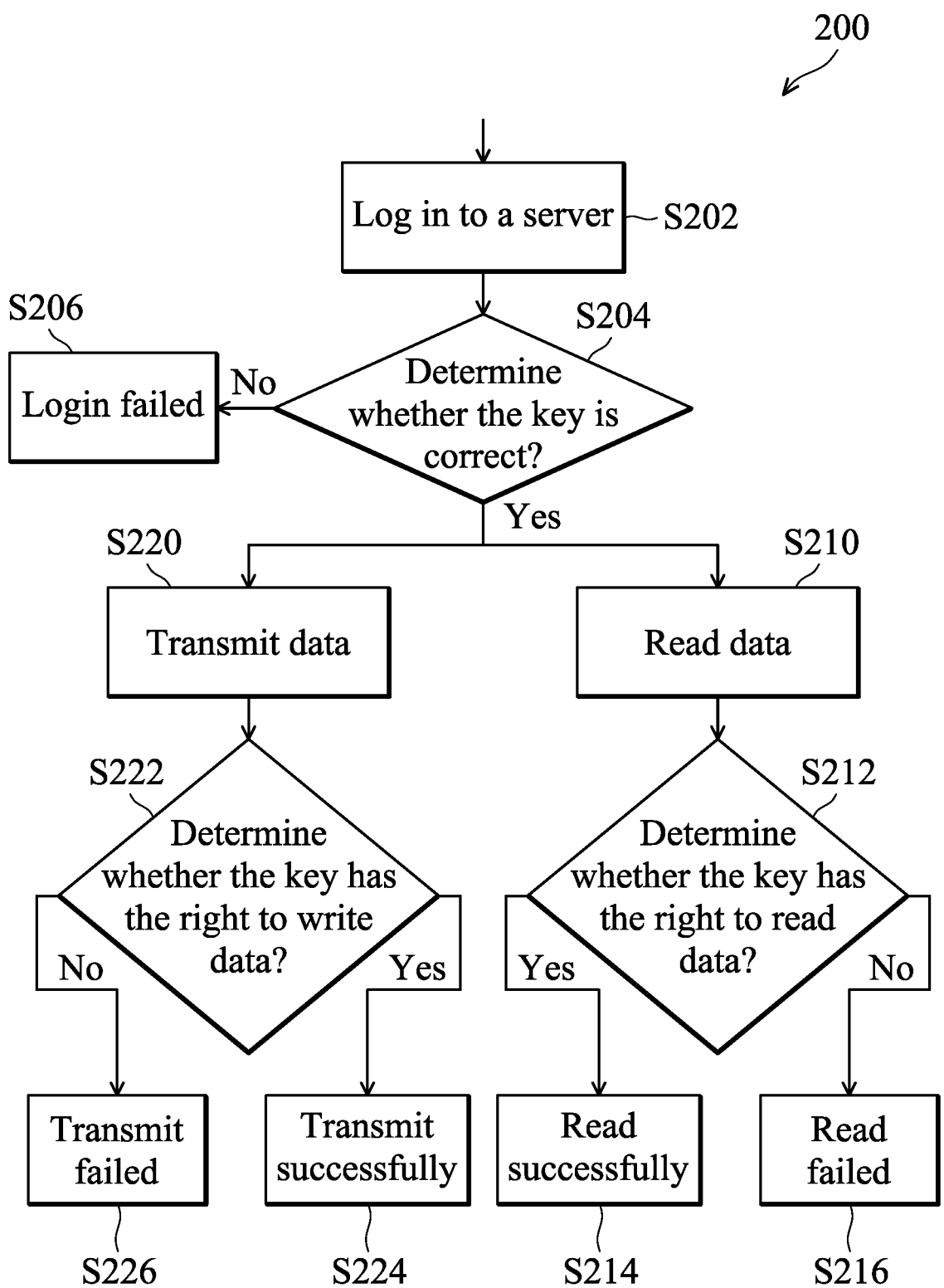
FIG. 2 is a flowchart of a data forwarding management method of the data forwarding system in accordance with one embodiment of the present disclosure.

FIG. 2 is a flowchart of a data forwarding management method 200 of the data forwarding system in accordance with one embodiment of the present disclosure. The method 200 begins in step S202, a terminal device attempts to log in to a server using a key. In step S204, if the key is correct, the terminal device successfully logs in, and step S210 or step S220 is performed according to its own needs. If the key is incorrect, the login failed (step S206).

At step S210, the terminal device attempts to read the specific data on the server. If the server determines that the key has the right to read the specific data in step S212, the terminal device is allowed to read the specific data (step S214). If the server determines that the key does not have the right to read the specific data, the terminal device is not allowed to transmit the data (step S216).

The steps S220-S226 are the steps of the terminal device attempting to transmit data to the server. The steps S220-S226 are similar to the steps S210-216 described above, and the difference is only that the reading of the data is replaced by the writing of the data.

Figure 3:
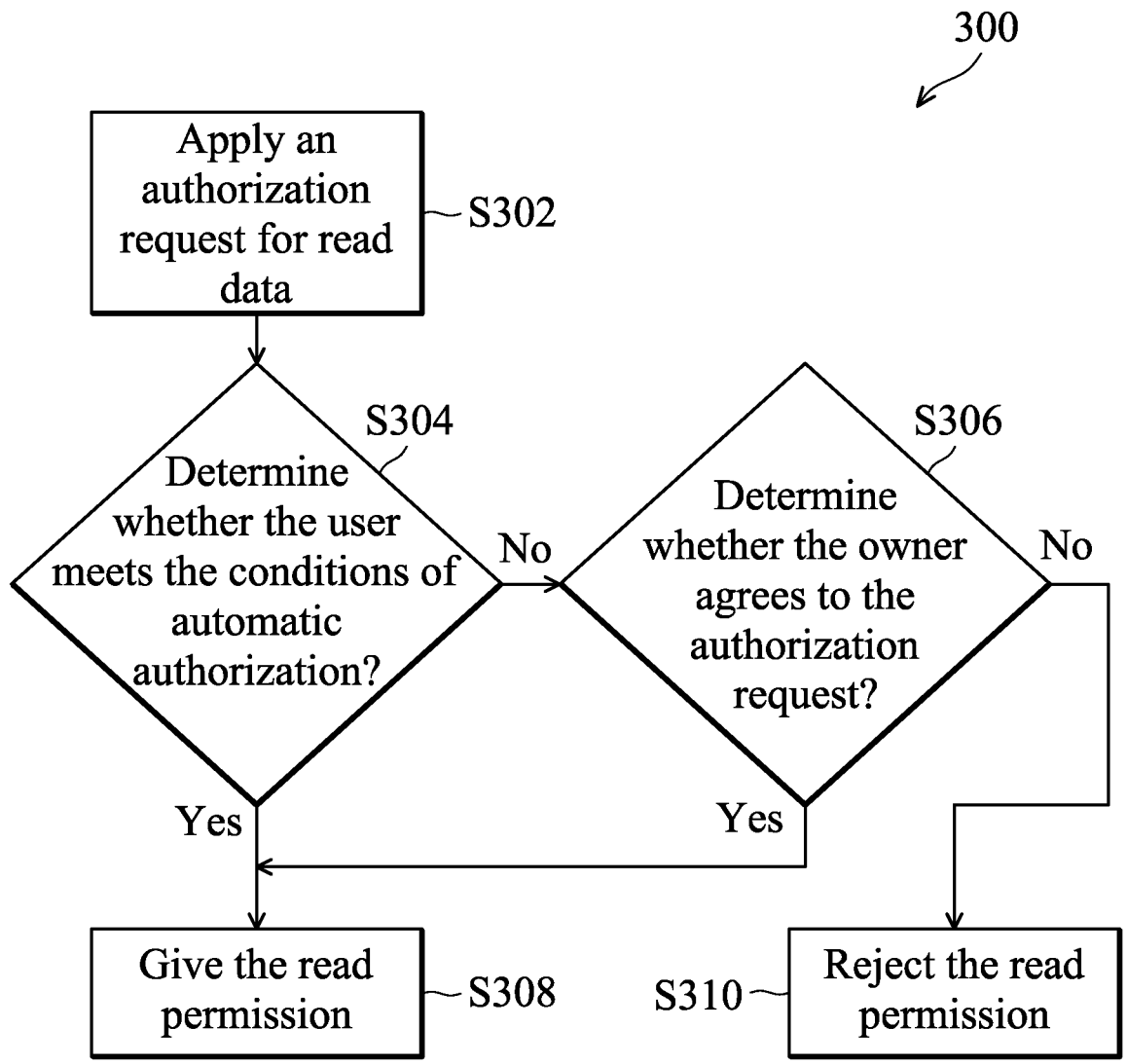
FIG. 3 is a flowchart of a key rights management method in accordance with one embodiment of the present disclosure.

FIG. 3 is a flowchart of a key rights management method 300 in accordance with one embodiment of the present disclosure. In step S302, a user wants to read a specific data in a server, so an authorization request is sent to the server. In step S304, the server determines whether the user meets the conditions of automatic authorization, and if yes, step S308 is performed to approve the authorization request, and gives the user the key to the read permission. If the server determines that the user does not meet the conditions of automatic authorization, step S306 is performed to forward the authorization request to the owner of the specific data.

In step S306, if the owner agrees to the authorization request, step S308 is performed to give the user the key to the read permission; otherwise, step S310 is performed to reject the authorization request.

Figure 4:
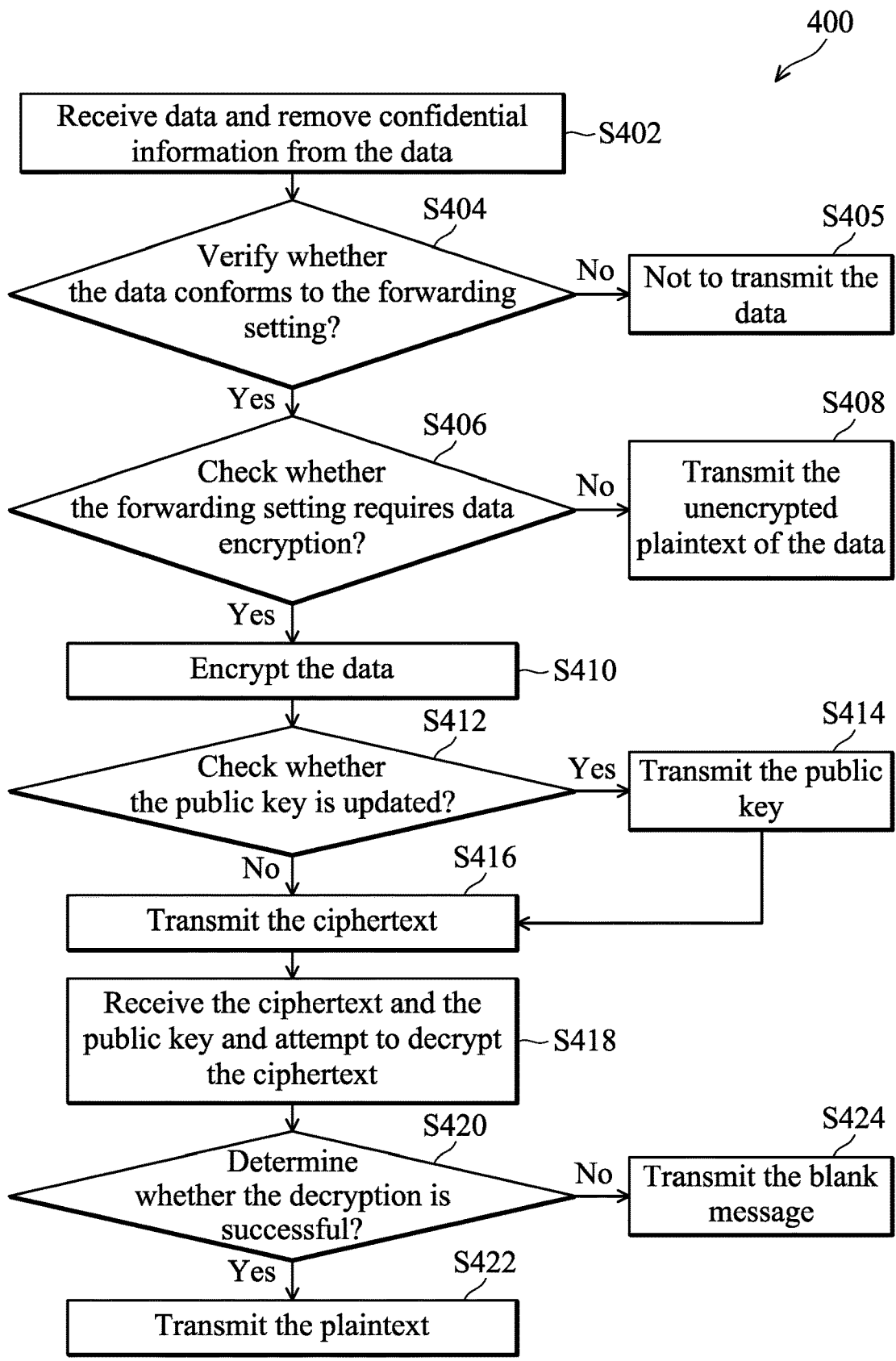
FIG. 4 is a flowchart of a data forwarding method of the data forwarding system in accordance with one embodiment of the present disclosure.

FIG. 4 is a flowchart of a data forwarding method 400 of the data forwarding system 100 in accordance with one embodiment of the present disclosure. The following will refer to FIG. 1A for related descriptions. In step S402 of the data forwarding method 400, the server 102 receives data (for example, the data is uploaded by the first user through the terminal device D1). The processor 102a in the server 102 executes a data processing procedure to remove confidential information from the data.

In step S404, the processor 102a executes a forwarding condition verification procedure to verify whether the data conforms to the forwarding settings. If no, step S405 is performed not to transmit the data temporarily, and the data is stored in the data storage device 102b. If yes, step S406 is performed.

At step S406, the processor 102a further checks whether the forwarding settings require data encryption before forwarding. If no, step S408 is preformed to directly transmit the unencrypted plaintext of the data to a receiving device (for example, terminal device D2); if yes, step S410 is performed to execute an encryption processing procedure through the processor 102a to encrypt the data according to the preset setting.

In step S412, it is checked whether the encryption processing procedure performed in step S410 updates the public key (or decryption key). If no, step S416 is performed to directly transmit the encrypted ciphertext to the receiving device. If yes, step S414 is performed to transmit the updated public key to the receiving device, and then step S416 is performed to transmit the ciphertext to the receiving device. It should be noted that the receiving device can update the public key that already exists after receiving the updated public key. In addition, if the receiving device does not have a sufficient decryption mechanism, the received ciphertext and public key can be transmitted back to the server 102 for decryption.

In step S418, the server 102 receives the ciphertext and the public key returned by the terminal device, and attempts to decrypt the ciphertext using the received public key. It should be noted that if the received public key is the correct public key (i.e., the received public key is the public key generated in step S402), the ciphertexts can be decrypted to obtain the data. The obtained data is the same as the data before being encrypted. If the received public key is not the correct public key (i.e., the received public key is a fake key), the ciphertexts cannot be reverted to the data which is the same as the data before being encrypted. In a common embodiment, a blank message is obtained after decryption using the wrong public key.

Therefore, in step S420, if the decryption in step S418 is successful, the data can be accessed, and step S422 is performed to transmit the data to the terminal device. If the decryption fails, a blank message is obtained, and step S424 is performed to transmit the blank message to the terminal device.

It should be noted that, in steps S418-S424, if the terminal device is a malicious device that intercepts the ciphertexts, since there is no correct public key, the decrypted data cannot be obtained finally. Thus, the data forwarding method 400 can provide a secure data forwarding mechanism.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A data forwarding system, comprising:
   a data storage device, configured to store shared data uploaded via a first terminal device, and
   a server, comprising a processor which can load program codes to execute:
   a forwarding procedure, configured to forward the shared data to a receiving device;
   a forwarding setting procedure, configured to apply forwarding settings to the shared data;
   a data processing procedure, configured to execute the necessary data processing before forwarding the shared data; and
   a forwarding condition verification procedure, configured to examine whether the shared data conforms to the forwarding settings;
   wherein the processor further executes:
   a key rights management procedure, configured to manage all authorized usage keys;
   a permission verification procedure, configured to verify the usage key of a second terminal device to determine usage rights of the shared data for the connection from the second terminal device; and
   an authorization request procedure, configured to request an authorization request of the shared data from a user of the second terminal device to notify a developer that an authorization review is to be performed.

2. The data forwarding system of claim 1, wherein the forwarding settings comprise whether to encrypt the shared data before forwarding the shared data; and
   the processor further executes an encryption processing procedure, and when the processor in the forwarding condition verification procedure determines to encrypt the shared data before forwarding the shared data, the processor encrypts the shared data and transmits a decryption key to the receiving device.

3. The data forwarding system of claim 2, wherein during the processor executing the encryption processing procedure, after automatically replacing the decryption key, the processor transmits the decryption key to the receiving device.

4. The data forwarding system of claim 1, wherein when the authorization request meets an established rule, the authorization request procedure determines that direct authorization is carried out without notifying the developer that the authorization review is to be performed.

5. The data forwarding system of claim 1, wherein the data storage device is a memory device disposed in the server.

* * * * *